United States Patent
Grimaldi et al.

(10) Patent No.: US 11,284,742 B2
(45) Date of Patent: *Mar. 29, 2022

(54) MULTI-FUNCTIONAL RF CAPACITIVE HEATING FOOD PREPARATION DEVICE

(71) Applicant: ILLINOIS TOOL WORKS, INC., Glenview, IL (US)

(72) Inventors: Giorgio Grimaldi, Northbrook, IL (US); Joshua M. Linton, Chicago, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 1809 days.

This patent is subject to a terminal disclaimer.

(21) Appl. No.: 14/842,160

(22) Filed: Sep. 1, 2015

(65) Prior Publication Data
US 2017/0055769 A1    Mar. 2, 2017

(51) Int. Cl.
  A47J 37/06    (2006.01)
  H05B 6/06    (2006.01)
  A23L 5/10    (2016.01)

(52) U.S. Cl.
  CPC .............. *A47J 37/0629* (2013.01); *A23L 5/15* (2016.08); *H05B 6/062* (2013.01); *A23V 2002/00* (2013.01)

(58) Field of Classification Search
  CPC ........ A47J 37/0629; A23L 5/15; H05B 6/062; A23V 2002/00
  See application file for complete search history.

(56) References Cited

U.S. PATENT DOCUMENTS

| | | | |
|---|---|---|---|
| 3,470,942 A | | 10/1969 | Fukada et al. |
| 3,486,023 A | * | 12/1969 | McKeown ................ G01J 5/44 |
| | | | 250/336.1 |
| 3,536,129 A | | 10/1970 | White |
| 3,809,845 A | | 5/1974 | Stenstrom |
| 3,966,973 A | * | 6/1976 | Henry .................. G01N 27/048 |
| | | | 324/307 |
| 3,974,355 A | | 8/1976 | Bach |
| 4,128,751 A | | 12/1978 | Sale |
| 4,196,332 A | | 4/1980 | MacKay B et al. |
| 4,210,795 A | | 7/1980 | Lentz |
| 4,296,299 A | | 10/1981 | Stottmann et al. |

(Continued)

FOREIGN PATENT DOCUMENTS

| DE | 2910961 A1 | 10/1980 |
|---|---|---|
| DE | 102008052228 A1 | 4/2010 |

(Continued)

OTHER PUBLICATIONS

International Search Report and Written Opinion of the International Searching Authority for corresponding International Application No. PCT/US2016/049658 dated Dec. 1, 2016.

*Primary Examiner* — Steven N Leff
(74) *Attorney, Agent, or Firm* — Burr & Forman, LLP

(57) ABSTRACT

A food preparation device may include at least two energy sources, a chamber into which at least two types of energy are providable via the at least two energy sources, and a cooking controller operably coupled to the at least two energy sources to selectively distribute power to respective ones of the at least two energy sources. The at least two energy sources may include a radio frequency (RF) capacitive heating source and a cold air source.

18 Claims, 13 Drawing Sheets

(56) References Cited

U.S. PATENT DOCUMENTS

| | | |
|---|---|---|
| 4,303,820 A | 12/1981 | Stottmann et al. |
| 4,316,070 A | 2/1982 | Prosise et al. |
| 4,343,979 A | 8/1982 | Barbini et al. |
| 5,961,871 A | 10/1999 | Bible et al. |
| 6,247,395 B1 | 6/2001 | Yamamoto |
| 2004/0016744 A1* | 1/2004 | Ottaway .................. A21B 2/00 219/391 |
| 2009/0236335 A1 | 9/2009 | Ben-Shmuel et al. |
| 2009/0321428 A1 | 12/2009 | Hyde et al. |
| 2010/0006564 A1 | 1/2010 | Ben-Shmuel et al. |
| 2010/0012645 A1* | 1/2010 | Baier .................... G01K 1/024 219/413 |
| 2010/0164488 A1 | 6/2010 | Lowe et al. |
| 2012/0097669 A1 | 4/2012 | Sim et al. |
| 2012/0164022 A1 | 6/2012 | Muginstein et al. |
| 2013/0200066 A1 | 8/2013 | Gelbart et al. |
| 2013/0206749 A1 | 8/2013 | Libman et al. |

FOREIGN PATENT DOCUMENTS

| | | |
|---|---|---|
| EP | 0278592 A2 | 8/1988 |
| EP | 1052502 A2 | 11/2000 |
| EP | 1075799 A1 | 2/2001 |
| EP | 1 447 632 A1 | 8/2004 |
| EP | 2051564 A1 | 4/2009 |
| EP | 2182774 A1 | 5/2010 |
| EP | 2205043 A1 | 7/2010 |
| EP | 2306785 A1 | 4/2011 |
| EP | 2434837 A1 | 3/2012 |
| EP | 2453716 A1 | 5/2012 |
| EP | 2475221 A1 | 7/2012 |
| FR | 2254286 A1 | 7/1975 |
| FR | 2353236 A1 | 12/1977 |
| FR | 2405023 A1 | 5/1979 |
| GB | 924071 | 4/1963 |
| JP | S5436660 A | 3/1979 |
| JP | H03142350 A | 6/1991 |
| JP | H0541971 A | 2/1993 |
| JP | 2000357583 A | 12/2000 |
| JP | 2002359064 A | 12/2002 |
| JP | 2003332037 A | 11/2003 |
| JP | 2004349116 A | 12/2004 |
| JP | 2005000053 A | 1/2005 |
| JP | 2008034244 A | 2/2008 |
| JP | 2008269793 A | 11/2008 |
| JP | 2009032638 A | 2/2009 |
| JP | 2009259511 A | 11/2009 |
| JP | 2010092795 A | 4/2010 |
| JP | 2010127524 A | 6/2010 |
| JP | 2010140696 A | 6/2010 |
| JP | 2010177006 A | 8/2010 |
| WO | 198200403 A1 | 2/1982 |
| WO | 199308705 A1 | 5/1993 |
| WO | 200051450 A1 | 9/2000 |
| WO | 2003019985 A1 | 3/2003 |
| WO | 2007096878 A2 | 8/2007 |
| WO | 2010052723 A1 | 5/2010 |
| WO | 2010134307 A1 | 11/2010 |
| WO | 2011138688 A2 | 11/2011 |
| WO | 2011145994 A1 | 11/2011 |
| WO | 2012001523 A2 | 1/2012 |
| WO | 2012051198 A1 | 4/2012 |
| WO | 2012144129 A1 | 10/2012 |
| WO | 2013021280 A2 | 2/2013 |
| WO | 2013033330 A2 | 3/2013 |
| WO | 2013140266 A2 | 9/2013 |
| WO | 2014006510 A1 | 1/2014 |
| WO | 2014041430 A2 | 3/2014 |
| WO | 2014188422 A2 | 11/2014 |
| WO | 2014191799 A1 | 12/2014 |
| WO | 2015037004 A1 | 3/2015 |
| WO | 2015052145 A1 | 4/2015 |

* cited by examiner

MULTI-FUNCTIONAL RF CAPACITIVE HEATING FOOD PREPARATION DEVICE

TECHNICAL FIELD

Example embodiments generally relate to food preparation devices and, more particularly, relate to multi-functional radio frequency (RF) capacitive heating food preparation devices.

BACKGROUND

Common thawing applications rely on the thermal conduction of heat from the surface to the interior to provide thawing. Due to freshness and product quality constraints, thawing often is done by immersion in water baths that are only slightly above freezing themselves or in refrigerators set to slightly above freezing (e.g., 35° F.-40° F.). Thawing times are often very long. With capacitive heating technologies that heat over the entire volume uniformly, thawing can be performed much more rapidly.

RF capacitive heating or microwave heating can sometimes be used to thaw foods in an ambient environment. However, when such heating methods are used, the rate at which the surface of a food product thaws (or is heated) can be substantially faster than the rate of thawing at the core of the food product as a result of exposure to the environmental temperature at the surface level but not the core. Accordingly, it may be desirable to achieve an improved food preparation device capable of thawing a food product evenly from surface to core.

BRIEF SUMMARY OF SOME EXAMPLES

Some example embodiments may provide a multi-functional RF capacitive food preparation device. In particular, some example embodiments may provide a food preparation device that provides, for example, uniform, sanitary, and rapid thawing of a food product from the exterior surface to the interior core by thawing the interior core with an RF capacitive heating source while cooling the exterior surface with a cold air source. In addition, capacitive RF thawing better preserves the quality of previously frozen food and improves the overall yield of thawed food by mitigating water loss caused by cellular damage during prolonged conventional thawing processes. Moreover, the food preparation device may simplify food preparation by providing various operator-selectable recipes and cycles to further prepare the food product.

In an example embodiment, a food preparation device is provided. The food preparation device may include at least two energy sources, a chamber into which at least two types of energy are providable via the at least two energy sources, and a cooking controller operably coupled to the at least two energy sources to selectively distribute power to respective ones of the at least two energy sources. The at least two energy sources may include an RF capacitive heating source and a cold air source.

In another alternative embodiment, a method of preparing food is provided. The method may include receiving a food product having an interior core and an exterior surface in a food preparation device chamber, initiating a food preparation program in response to an operator selecting the food preparation program on an interface panel, and controlling volumetric thermal conditions of the food product via an RF capacitive heating source and an air source according to the food preparation program. The RF capacitive heating source may include a ground plate and an anode plate, and the air source may include at least one of a cold air source or a heat source.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
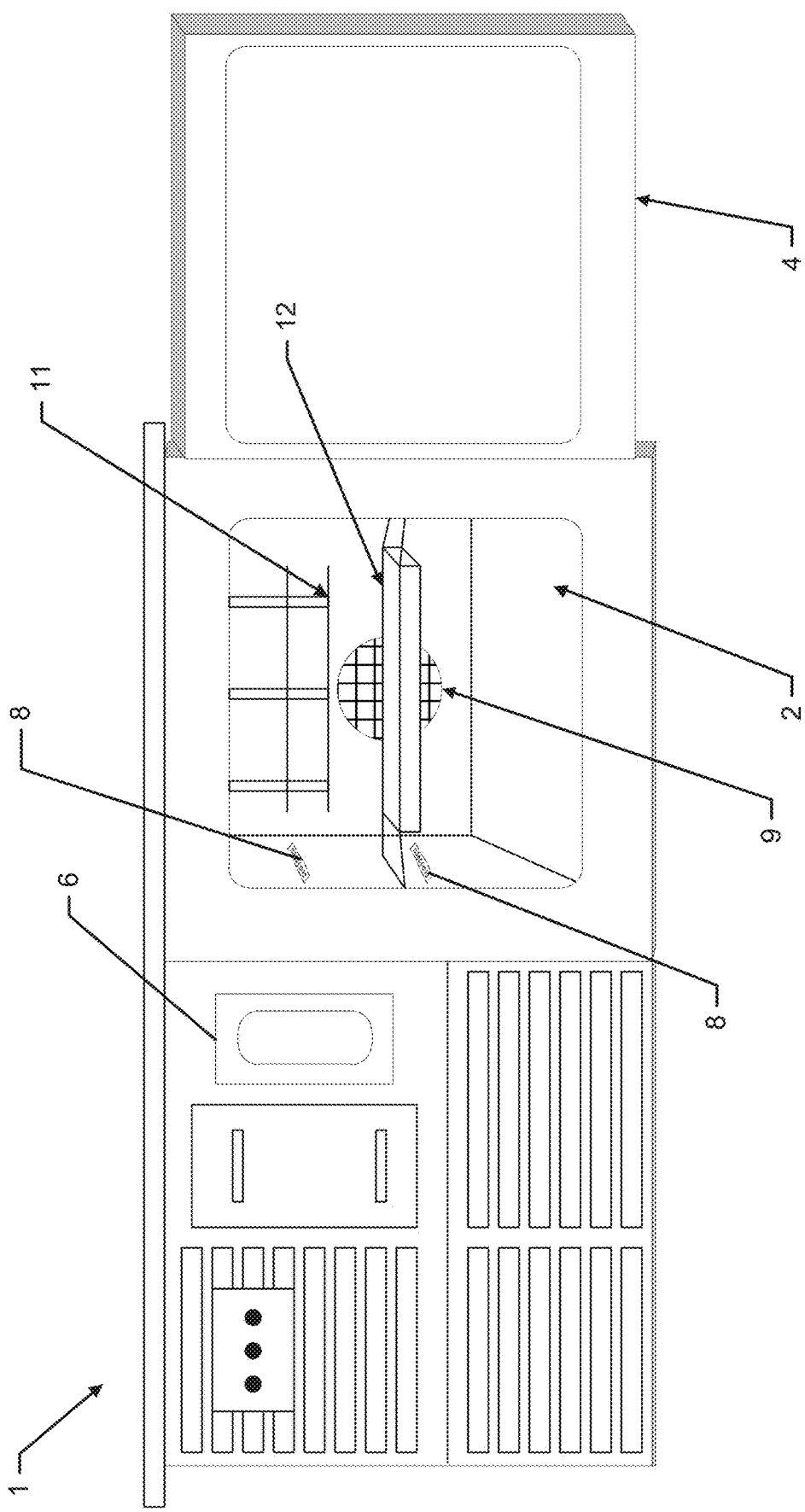
FIG. 1 illustrates a perspective view of a food preparation device employing at least an RF capacitive heating source and a cold air source according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the thawing and/or cooking performance of a food preparation device and/or may improve the operator experience of individuals employing an example embodiment. In this regard, some example embodiments may provide for the employment of multiple energy sources to deliver energy into a cooking chamber.

FIG. 1 illustrates a perspective view of a food preparation device 1 according to an example embodiment. The food preparation device 1 may be a heating device of any type for heating food products, thawing frozen materials, and/or the like. Thus, the food preparation device 1 need not necessarily be embodied only as a blast chiller, combination oven, or a microwave oven, but could alternatively be a thawing, warming, sterilizing or other device that applies RF energy. As shown in FIG. 1, the food preparation device 1 may include a cooking chamber 2 into which a food product may be placed for the application of energy (e.g., RF capacitive heat, cold air, heat and/or the like). In some cases, the food preparation device 1 may apply energy using any of at least two energy sources that may be employed by the food preparation device 1.

The at least two energy sources employed by the food preparation device include at least a cold air source and an RF capacitive heating source. The cold air source may include, for example, one or more jet plates 8 positioned within the cooking chamber 2 so as to enable cold air to be forced over a surface of a food product placed within the cooking chamber 2 via air delivery orifices disposed in the jet plates 8. If the jet plates 8 are employed, a chamber outlet port 9 may also be employed to extract air from the cooking chamber 2. After removal from the cooking chamber 2 via the chamber outlet port 9, air may be cleaned, chilled, and pushed through the system by other components prior to return of the clean, cold, and speed-controlled air back into the cooking chamber 2. The chamber outlet port 9 and the jet plates 8 may also be arranged differently within the cooking chamber 2 in alternative embodiments.

The RF capacitive heating source includes an anode plate 11 (i.e. upper electrode) and a ground plate 12 (i.e. lower electrode, cathode plate). In some example embodiments, both the anode plate 11 and the ground plate 12 may be flat, horizontal plates situated substantially parallel to each other. In other example embodiments, the anode plate (i.e. upper electrode) 11 and the ground plate 12 (i.e. lower electrode) may be flexible electrodes capable of conforming to a surface profile or outer contour of the food product regardless of the food product's shape. In some embodiments, the RF capacitive heating source transmits RF energy from about 10 MHz to about 50 MHz. For example, RF energy at the 13 MHz, 27 MHz, or 41 MHz frequency may be transmitted from the anode plate 11 to the ground plate 12, although other frequencies in the RF and microwave spectrum are also possible. Between the anode plate 11 and the ground plate 12, a food product of any size, shape, mass, or composition may be placed. After the food product is situated between the anode plate 11 and the ground plate 12 in the sufficiently sealed cooking chamber 2 to prevent electromagnetic leakage, a power source (not shown) may be activated that generates an oscillating electromagnetic field at either 13 MHz or 27 MHz or 41 MHz (frequency is based upon the system's particular design). The electrical signal may be provided through an impedance matching device (not shown) to generate the oscillating electromagnetic field between the anode plate 11 and the ground plate 12, through the food product. The oscillating electromagnetic field between the two plates 11, 12 is very uniform as a direct consequence of the food preparation device 1 design and thereby offers much utility to food processing applications where the control of food products' volumetric thermal conditions is of the utmost importance (e.g. thawing and cooking applications).

When energy is transmitted from the anode plate 11 through the food product to the ground plate 12, some energy may be absorbed by the food product, some energy may be reflected away from the food product, and some energy may be received by the ground plate 12. As a mass of food product (e.g., frozen food product) absorbs energy, its thermal conditions and physical properties change (e.g., energy absorption causes frozen the food product to thaw, transforming ice crystals into water). As the food product thaws, for example, the impedance properties of the food product within the oscillating electromagnetic field between the anode plate 11 and the ground plate 12 changes and therefore so does the relationship between the power which is absorbed by the food product, reflected, or received into the ground plate 12. This changing relationship may be an ongoing occurrence which transpires continuously during the operation of the food preparation device 1. As the most desirable thawing results are those which are achieved through careful management of the power running through the food preparation device 1, for instance, the impedance matching device (not shown) and its respective electronic control may allow the food preparation device 1 to automatically adjust in real-time to the changing electrical impedance of the food product as it transitions, for example, from frozen to thawed. By including both the cold air source and the RF capacitive heating source, for example, supercooled airflow circulated inside the cooking chamber 2 may control and/or slow the rate of thawing at the exterior surface of the food product in order to mitigate thermal runaway at the exterior surface while the food product interior core is being thawed via the RF capacitive heating source. In this regard, for instance, the food product may be evenly thawed from the exterior surface to the interior core.

The cooking chamber 2 may include a door 4 and an interface panel 6, which may sit proximate to the door 4 when the door 4 is closed. The door 4 may be configured to hingedly operate to alternately allow access to the cooking chamber 2 and close the cooking chamber 2 for food preparation. The user interface panel 6 may be the mechanism by which instructions are provided to the operator, and the mechanism by which feedback is provided to the operator regarding cooking process status, options and/or the like. In this regard, the user interface panel 6 may be a guided user interface (GUI) that is easily programmed by the user according to unique usage demands of a particular foodservice establishment. In an example embodiment, the user interface panel 6 may include a touch screen display capable of providing visual indications to an operator and further capable of receiving touch inputs from the operator. In certain example embodiments, the user interface panel 6 may display preprogrammed recipes and cycles from which the operator may select a food preparation program. In other examples, the user interface panel 6 may include a simple interface of buttons, lights, dials and/or the like. In further examples, an operator may remotely control the user interface panel 6 from a mobile electronic device including, but not limited to, a smartphone, a tablet, a laptop and/or the like.

As discussed above, the cooking chamber 2 should be sufficiently sealed to prevent electromagnetic leakage. In this regard, in an example embodiment the door 4 may be provided with a choke assembly (not shown) to prevent leakage of RF energy generated within the cooking chamber 2 to areas external to the food preparation device 1. In such embodiments, for example, the choke assembly may extend around a window portion of the door 4 to coincide with sidewalls and the top and bottom walls defining the cooking chamber 2. Thus, when the door 4 is closed, the walls of the cooking chamber 2, the window portion of the door 4, and the choke assembly may combine to contain RF energy and inhibit or prevent RF leakage.

Figure 2:
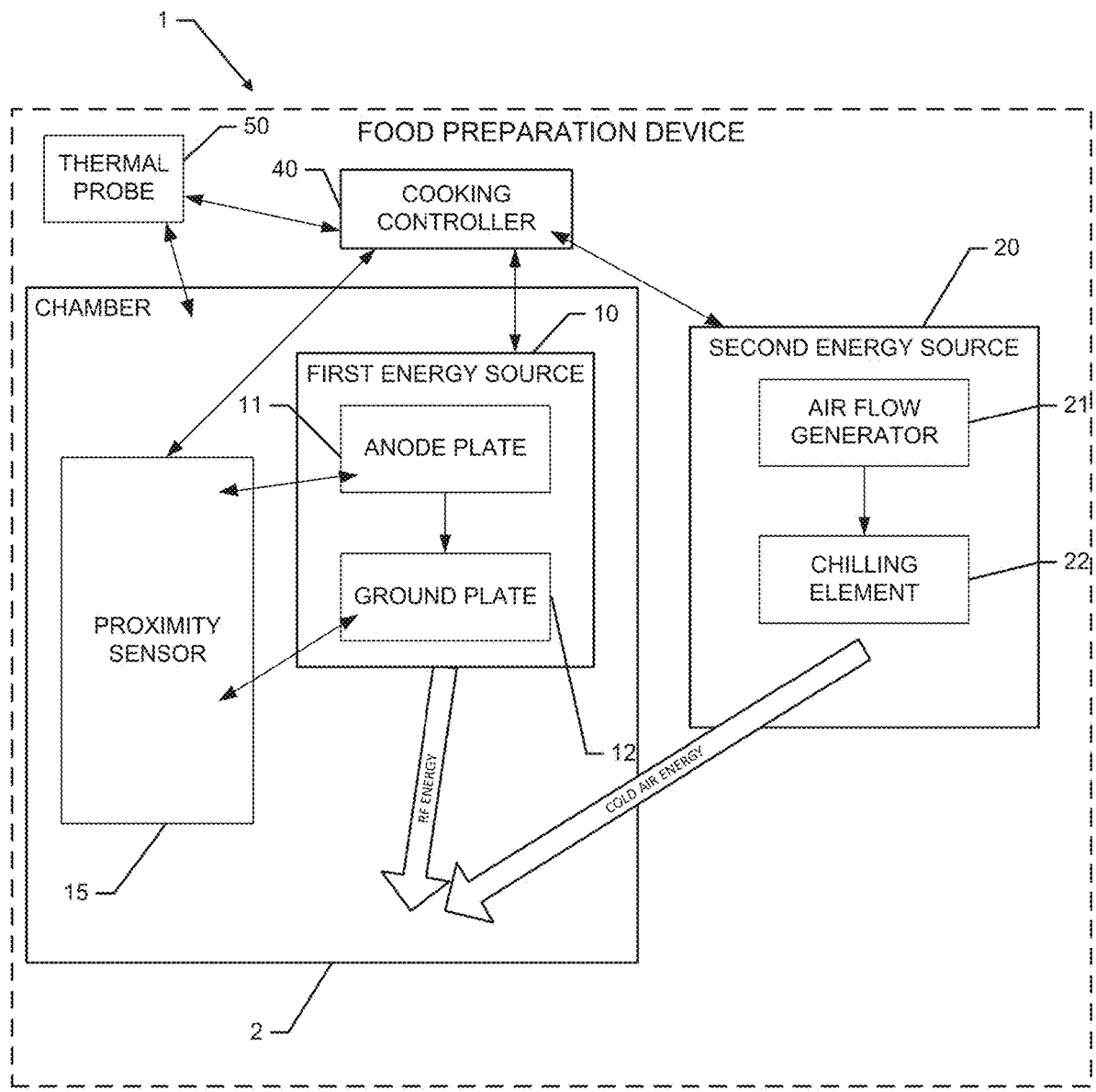
FIG. 2 illustrates a functional block diagram of a food preparation device employing at least an RF capacitive heating source and a cold air source according to an example embodiment.

FIG. 2 illustrates a functional block diagram of the food preparation device 1 according to an example embodiment. As shown in FIG. 2, the food preparation device 1 may include at least a first energy source 10 and a second energy source 20. The first and second energy sources 10 and 20 may each correspond to respective different cooking methods or may be combined in one of several different cooking methods. However, it should be appreciated that additional energy sources may also be provided in some embodiments and, as stated above, some embodiments may only employ a single energy source.

In an example embodiment, the first energy source 10 may be an RF capacitive heating source having the anode plate 11 and the ground plate 12 as discussed herein. Both the anode plate 11 and the ground plate 12 may be flat, horizontal plates situated substantially parallel to each other and at least one of the plates may be mobile along an axis (e.g., vertical axis). To take advantage of the fact that the anode plate 11 and the ground plate 12 are mobile, the food preparation device 1 may include an optional proximity sensor 15. The proximity sensor 15 may be configured to sense the precise physical location of a food product within the cooking chamber 2 and/or a distance between the anode plate 11 and the ground plate 12. By having knowledge of the distance between the anode plate 11 and the ground plate 12 via the proximity sensor 15, it may be possible to automatically mechanically position at least one of the plates via a cooking controller 40 according to settings pre-programmed into the cooking controller 40 without reliance on the operator. The proximity sensor 15 may be configured to detect objects in an electric field using an integrated circuit that generates a low-frequency sine wave. The low-frequency sine wave may be adjustable by using an external resistor, optimized for 120 kHz, and may have very low harmonic content to reduce harmonic interference. The proximity sensor 15 may also include support circuits for a microcontroller unit to allow the construction of a two-chip E-field system. In this regard, the proximity sensor 15 (and its associated software functionality) may eliminate the need for an operator to engage in the accurate or precise positioning of the anode plate 11 and/or the ground plate 12 relative to the shape, size, and/or physical location of the food product by automating such functionality.

In some example embodiments, the second energy source 20 may be a cold air source. Thus, for example, the second energy source 20 may include an airflow generator 21 and a chilling element 22. In examples where the second energy source 20 includes the airflow generator 21, the airflow generator 21 may include a fan or other device capable of driving airflow through the cooking chamber 2 and over a surface of the food product (e.g., via the airflow slots). The chilling element 22 may be a chilling element that employs a refrigerant or other type of chiller that cools air to be driven over the surface of the food product by the airflow generator 21. Both the temperature of the air and the speed of airflow will impact chilling times that are achieved using the second energy source 20.

In an example embodiment, the first and second energy sources 10 and 20 may be controlled, either directly or indirectly, by the cooking controller 40. Moreover, it should be appreciated that either or both of the first and second energy sources 10 and 20 may be operated responsive to settings or control inputs that may be provided at the beginning, during or at the end of a program cooking cycle. Furthermore, energy delivered via either or both of the first and second energy sources 10 and 20 may be displayable via operation of the cooking controller 40. The cooking controller 40 may be configured to receive inputs descriptive of the food product and/or cooking conditions in order to provide instructions or controls to the first and second energy sources 10 and 20 to control the cooking process. The first energy source 10 may be said to provide heating of the food product interior core, while the second energy source 20 provides cooling of the food product exterior surface to prevent thermal runaway that might otherwise occur at the exterior surface due to the operation of the first energy source 10.

In an example embodiment, the food preparation device 1 may further include a thermal probe 50 to sense the internal temperature of a food product while the food product is being treated with RF energy. The thermal probe 50 may be a wireless thermal probe using an RF excitation-detection technique with nuclear magnetic resonance (NMR). The thermal probe 50 may include a quartz-crystal resonator with high temperature sensitivity (i.e. 88 ppm/° C.). In this regard, changes in the quartz resonance frequency reflecting temperature variations are detected by an NMR coil multiply tuned to the resonance frequencies of the quartz crystal and the nuclei of interest. The thermal probe 50 measures temperature changes from about −60° F. to about 305° F. because the high frequency linearity of the thermal probe 50 in this temperature region ensures a simple calibration procedure and a constant temperature resolution.

Figure 3:
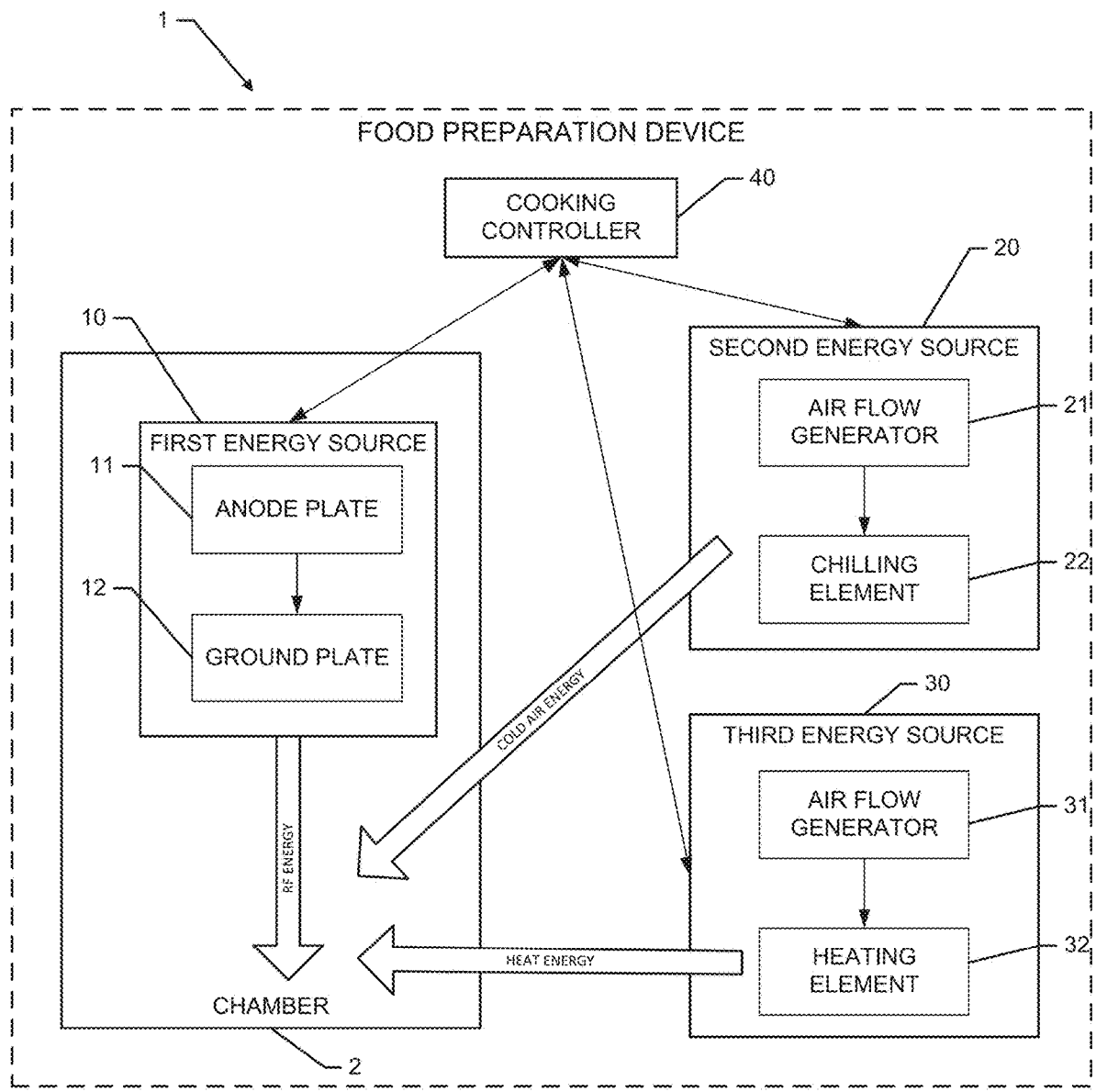
FIG. 3 illustrates a functional block diagram of a food preparation device employing at least an RF capacitive heating source, a cold air source, and a heat source in accordance with an example embodiment.

In some example embodiments, the food preparation device 1 may further comprise a third energy source. FIG. 3, for example, illustrates a functional block diagram of a food preparation device employing at least an RF capacitive heating source, a cold air source, and a heat source in accordance with an example embodiment. As shown in FIG. 3, the third energy source 30 may include an airflow generator 31 and a heating element 32. In examples where the third energy source 30 includes the airflow generator 31, the airflow generator 31 may include a fan or other device capable of driving airflow through the cooking chamber 2 and over a surface of the food product (e.g., via the airflow slots). The heating element 32 may be an electrical heating element or other type of heater that heats air to be driven over the surface of the food product by the airflow generator 31. In example embodiments, the heat source may include magnetic induction, infrared light, hot convection air, steam, or any combination thereof. Both the temperature of the air and the speed of airflow will impact heating times that are achieved using the third energy source 30. As previously discussed in regard to the first and second energy sources 10 and 20, the third energy source 30 may be controlled, either directly or indirectly, by the cooking controller 40.

Figure 4:
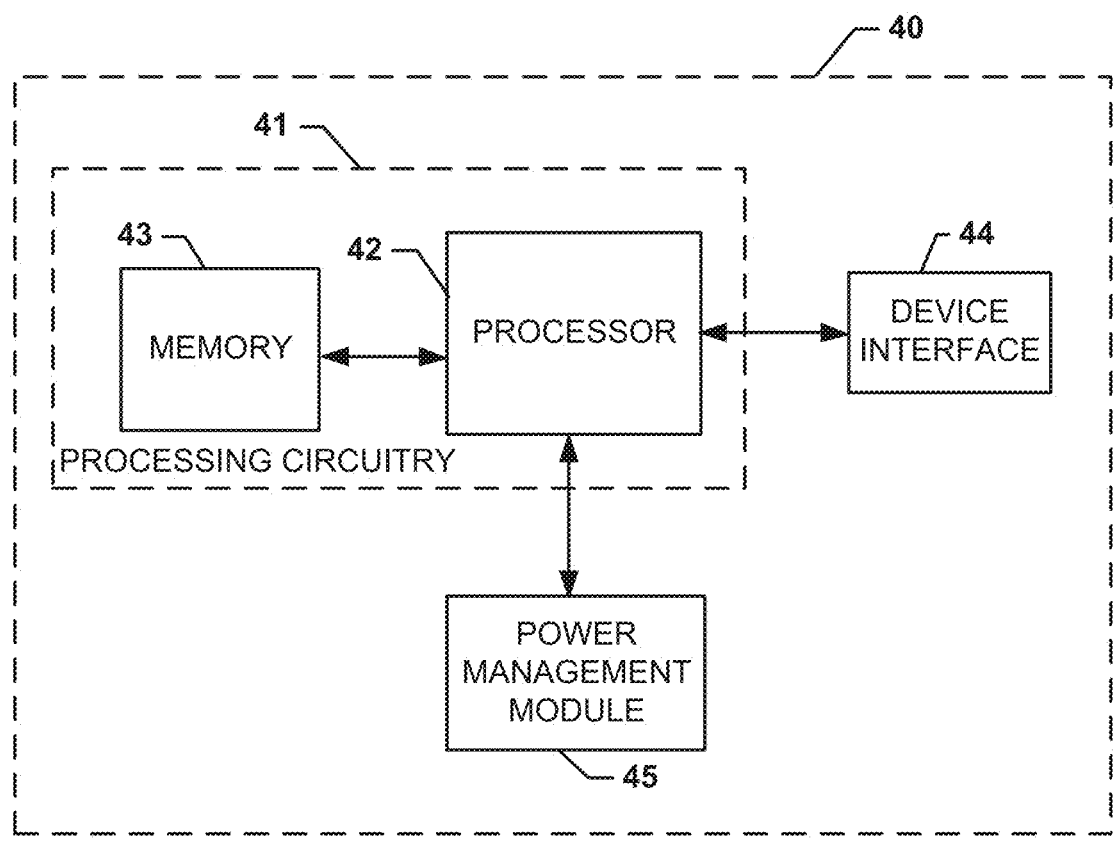
FIG. 4 illustrates a block diagram of a cooking controller according to an example embodiment.

In an example embodiment, the cooking controller 40 may be any means such as a device or circuitry embodied in either hardware, or a combination of hardware and software that is configured to execute (or provide instructions for execution of) a strategic control over power distribution to the at least two energy sources. In this regard, the cooking controller is configured to control volumetric thermal conditions of a food product having an interior core and an exterior surface. In some embodiments, the cooking controller may monitor at least one of humidity, temperature, time, or any combination thereof. FIG. 4 illustrates a block diagram of the cooking controller 40 in accordance with an example embodiment. In this regard, as shown in FIG. 4, the cooking controller 40 may include processing circuitry 41 that may be configured to interface with, control or otherwise coordinate the operations of various components or modules described herein in connection with controlling power distribution to the at least two energy sources as described herein. The cooking controller 40 may utilize the processing circuitry 41 to provide electronic control inputs to one or more functional units of the cooking controller 40 to receive, transmit and/or process data associated with the one or more functional units and perform communications necessary to enable performance of an operator-selected food preparation program as described herein.

In some embodiments, the processing circuitry 41 may be embodied as a chip or chip set. In other words, the processing circuitry 41 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 41 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 41 may include one or more instances of a processor 42 and memory 43 that may be in communication with or otherwise control a device interface 44. As such, the processing circuitry 41 may be embodied as a circuit chip (e.g., an integrated circuit chip) configured (e.g., with hardware, software or a combination of hardware and software) to perform operations described herein.

The device interface 44 may include one or more interface mechanisms for enabling communication with other components or devices (e.g., the user interface panel 6). In some cases, the device interface 44 may be any means such as a device or circuitry embodied in either hardware, or a combination of hardware and software that is configured to receive and/or transmit data from/to devices or components in communication with the processing circuitry 41 via internal and/or external communication mechanisms. Accordingly, for example, the device interface 44 may further include wired and/or wireless communication equipment for at least communicating with the at least two energy sources, and/or other components or modules described herein.

The processor 42 may be embodied in a number of different ways. For example, the processor 42 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 42 may be configured to execute instructions stored in the memory 43 or otherwise accessible to the processor 42. As such, whether configured by hardware or by a combination of hardware and software, the processor 42 may represent an entity (e.g., physically embodied in circuitry—in the form of processing circuitry 41) capable of performing operations according to embodiments of the present invention while configured accordingly. Thus, for example, when the processor 42 is embodied as an ASIC, FPGA or the like, the processor 42 may be specifically configured hardware for conducting the operations described herein. Alternatively, as another example, when the processor 42 is embodied as an executor of software instructions, the instructions may specifically configure the processor 42 to perform the operations described herein in reference to execution of an example embodiment.

In an exemplary embodiment, the memory 43 may include one or more non-transitory memory devices such as, for example, volatile and/or non-volatile memory that may be either fixed or removable. The memory 43 may be configured to store information, data, applications, instructions or the like for enabling the processing circuitry 41 to carry out various functions in accordance with exemplary embodiments of the present invention. For example, the memory 43 may be configured to buffer input data for processing by the processor 42. Additionally or alternatively, the memory 43 may be configured to store instructions for execution by the processor 42. As yet another alternative or additional capability, the memory 43 may include one or more databases that may store a variety of data sets or tables useful for operation of the modules described below and/or the processing circuitry 41. Among the contents of the memory 43, applications or instruction sets may be stored for execution by the processor 42 in order to carry out the functionality associated with each respective application or instruction set. In some cases, the applications/instruction sets may include instructions for carrying out some or all of the operations described in reference to algorithms or flow charts for directing control over power distribution and/or various components of the food preparation device 1 as described herein. In particular, the memory 43 may store executable instructions that enable the computational power of the processing circuitry 41 to be employed to improve the functioning of the cooking controller 40 relative to the control over the at least two energy sources as described herein. As such, the improved operation of the computational components of the cooking controller 40 transforms the cooking controller 40 into a more capable power distribution control device relative to the at least two energy sources and/or food preparation device 1 associated with executing example embodiments.

As shown in FIG. 4, the cooking controller 40 may further include (or otherwise be operably coupled to) a power management module 45. In some examples, the processor 42 (or the processing circuitry 41) may be embodied as, include or otherwise control various modules (e.g., the power management module 45) that are configured to perform respective different tasks associated with the cooking controller 40. As such, in some embodiments, the processor 42 (or the processing circuitry 41) may be said to cause each of the operations described in connection with the power management module 45 as described herein.

The power management module 45 may be any means such as a device or circuitry embodied in either hardware, or a combination of hardware and software that is configured to execute control over the distribution of power to the at least two energy sources. In this regard, the power management module 45 may be configured to receive cooking information (e.g., from a user via the user interface panel 6) regarding the food product or a cooking mode or program to be executed. Based on the cooking information provided, the power management module 45 may select a power distribution algorithm from among a plurality of stored power distribution algorithms. The selected power distribution algorithm may then be executed to provide power to the desired energy sources at desirable times, power levels, sequences and/or the like.

In an example embodiment, the power management module 45 may include a plurality of stored algorithms, each of which defines a corresponding pattern (e.g., predetermined or random) for power distribution to the at least two energy sources. In some cases, the stored algorithms may be associated with corresponding different cooking programs, cooking modes, or such algorithms may be named and selectable by the user from a menu. Regardless of how selected, once the power management module 45 selects an algorithm, the selected power distribution algorithm may be executed by the processing circuitry 41, which ultimately provides for control inputs to be provided to the at least two energy sources.

In some embodiments, the cooking controller 40 (and/or the power management module 45) may be configured to receive static and/or dynamic inputs regarding the food product and/or cooking conditions. Dynamic inputs may include feedback data regarding absorption of RF spectrum, as described above. In some cases, dynamic inputs may include adjustments made by the operator during the cooking process. The static inputs may include parameters that are input by the operator as initial conditions. For example, the static inputs may include a description of the food type, initial state or temperature, final desired state or temperature, a number and/or size of portions to be cooked, a location of the item to be cooked (e.g., when multiple trays or levels are employed), and/or the like.

Figure 5:
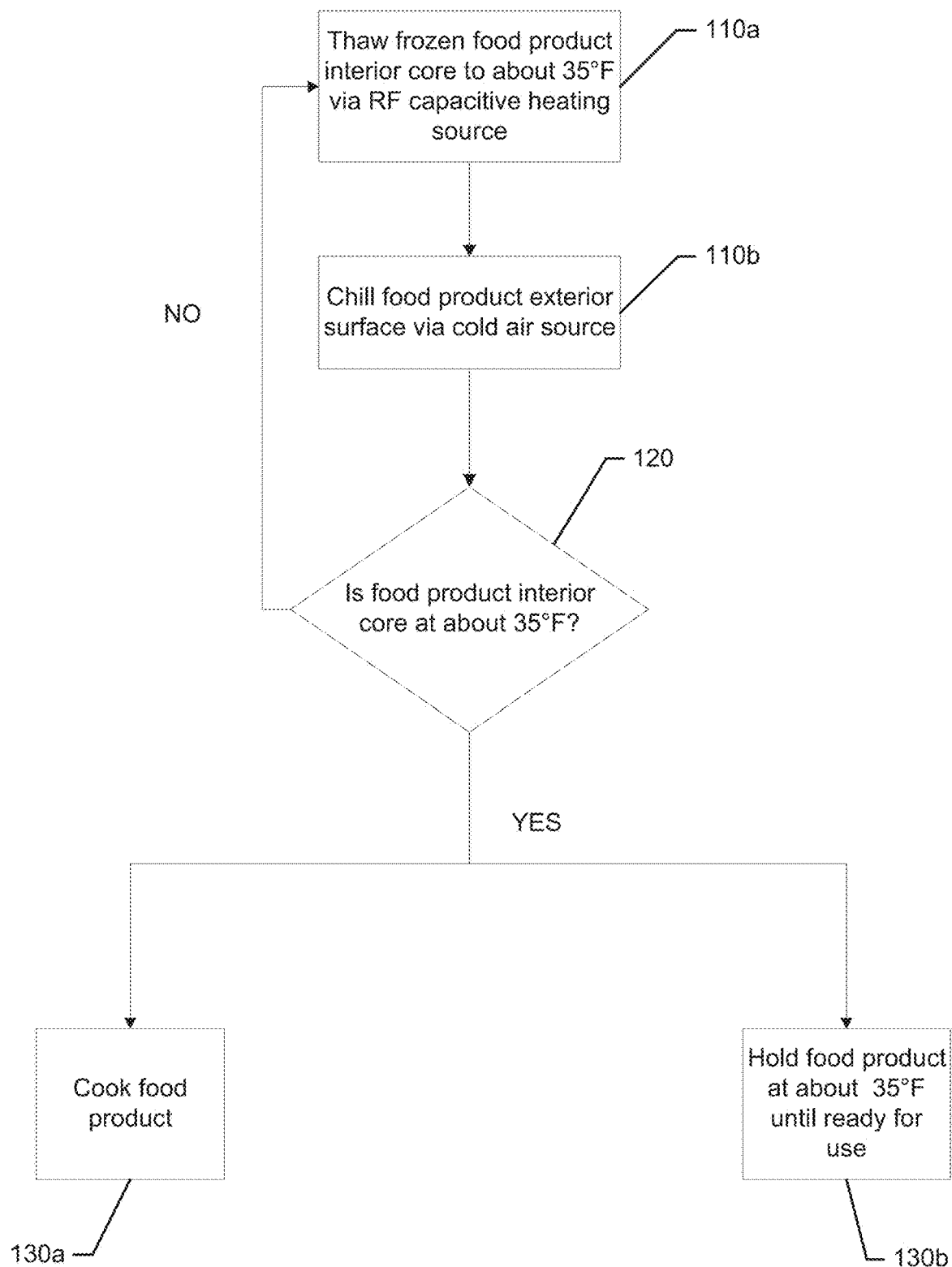
FIG. 5 illustrates a control flow diagram of one example of how the cooking controller thaws a food product in accordance with an example embodiment.

FIGS. 5-12 illustrate examples of how the cooking controller 40 controls volumetric thermal conditions of a food product according to example embodiments. It should be understood that the cooking controller 40 operates to interact with and control other functional units of the food preparation device 1. As such, when various functions or activities are attributed to the cooking controller 40 herein, it should be further appreciated that such functions or activities may be performed via the exercising of control over other components. FIG. 5, for example, illustrates a control flow diagram of one example of how the cooking controller 40 thaws a food product in accordance with an example embodiment. As shown in FIG. 5, the cooking controller 40 thaws a frozen food product interior core to about 35° F. via the RF capacitive heating source at operation 110a and chilling the food product exterior surface via the cold air source at operation 110b. While operations 110a and 110b appear in series in FIG. 5, it may be understood that operations 110a and 110b may occur sequentially, in reverse, or simultaneously. In this regard, the food product may be rapidly and uniformly thawed without partial cooking in order to maintain natural moisture and inherent food product quality. The cooking controller 40 then determines whether the food product interior core has reached about 35° F. at operation 120. If the food product interior core has reached about 35° F., then the cooking controller 40 may cook the food product at operation 130a or hold the food product at about 35° F. until ready for use at operation 130b. Moreover, the food product may be immediate consumed. However, if the food product interior core has not reached about 35° F., then the cooking controller 40 may continue to thaw the food product interior core to about 35° F. via the RF capacitive heating source while chilling the food product exterior surface via the cold air source at operations 110a and 110b respectively. As such, the cooking controller 40 may repeat the entire process illustrated in FIG. 5 as needed.

According to certain embodiments, for example, the cooking controller may thaw the food product interior core to a temperature from about 32° F. to about 40° F. In other embodiments, for instance, the cooking controller 40 may thaw the food product interior core to a temperature from about 33° F. to about 37° F. In further embodiments, for example, the cooking controller 40 may thaw the food product interior core to a temperature to about 35° F. As such, in certain embodiments, the cooking controller 40 may thaw the food product interior core to a temperature from at least about any of the following: 32, 33, 34, and 35° F. and/or at most about 40, 39, 38, 37, 36, and 35° F. (e.g., about 34-38° F., about 35-40° F., etc.).

Figure 6:
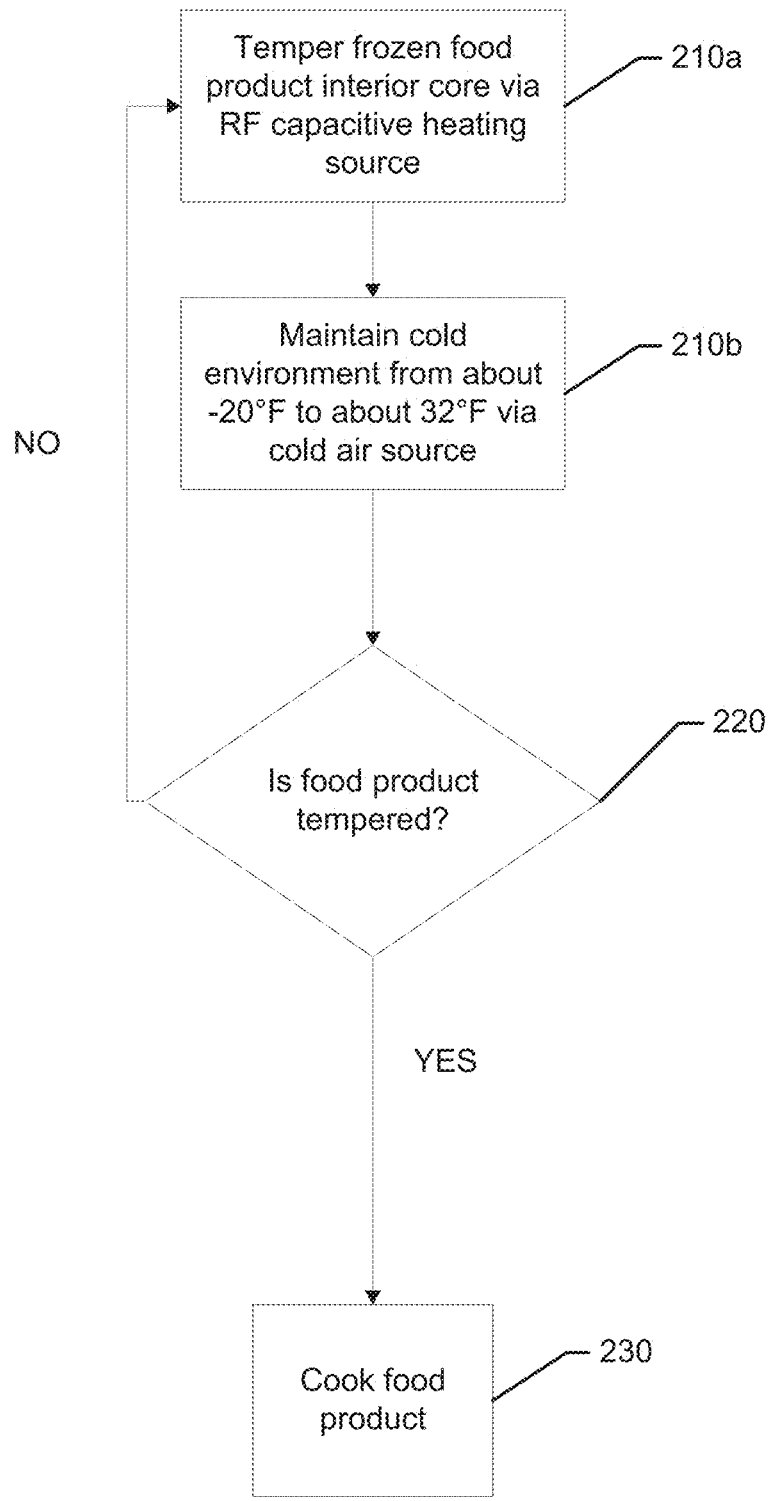
FIG. 6 illustrates a control flow diagram of one example of how the cooking controller tempers a food product in accordance with an example embodiment.

FIG. 6, for example, illustrates a control flow diagram of one example of how the cooking controller 40 tempers a food product in accordance with an example embodiment. In this regard, the frozen food product may be pre-staged and/or pre-thawed for immediate cooking by exposing the food product to a limited amount of heat prior to cooking. For example, the cooking controller 40 may employ high powered thawing of frozen portion-sized food products (e.g., chicken wings) for immediate transfer to hot oil (or any other direct or indirect heat source) for cooking. As shown in FIG. 6, the cooking controller 40 tempers a frozen food product interior core via the RF capacitive heating source at operation 210a and maintains a cold environment from about −20° F. to about 32° F. within the cooking chamber 2 via the cold air source at operation 210b. While operations 210a and 210b appear in series in FIG. 5, it may be understood that operations 210a and 210b may occur sequentially, in reverse, or simultaneously. The cooking controller 40 then determines whether the food product is adequately tempered at operation 220. If the food product has been adequately tempered, then the food product is ready for cooking at operation 230. If the food product has not been adequately tempered, then the cooking controller 40 may continue to temper the food product interior core via the RF capacitive heating source while maintaining the cold environment from about −20° F. to about 32° F. within the cooking chamber 2 via the cold air source at operations 210a and 210b respectively. As such, the cooking controller 40 may repeat the entire process illustrated in FIG. 6 as needed.

Figure 7:
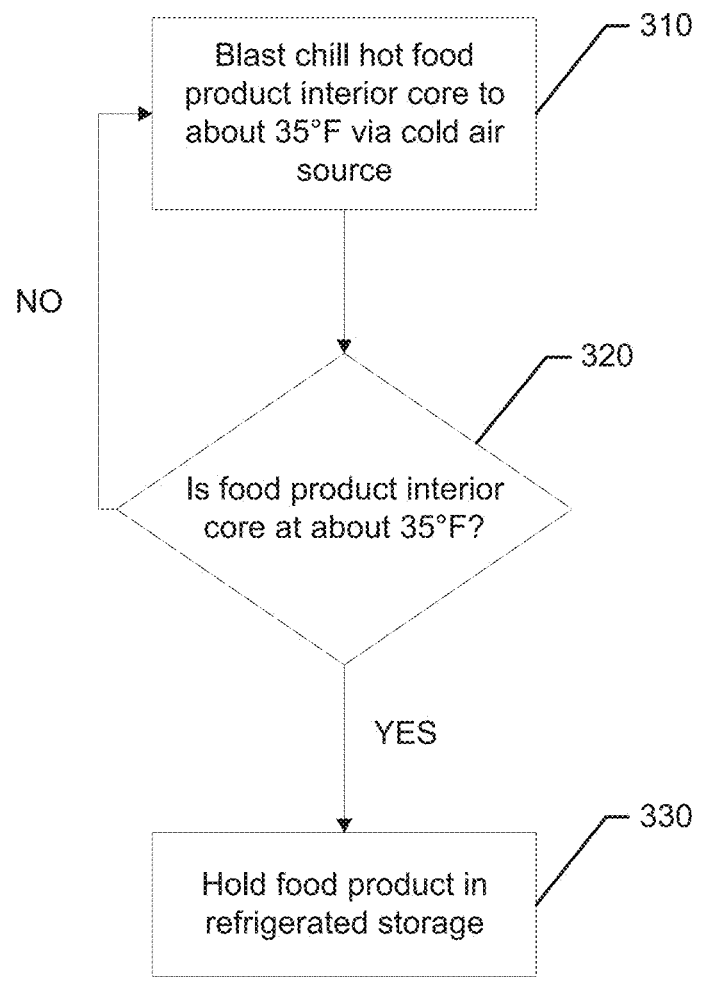
FIG. 7 illustrates a control flow diagram of one example of how the cooking controller blast chills a food product according to an example embodiment.

FIG. 7, for example, illustrates a control flow diagram of one example of how the cooking controller 40 blast chills a food product according to an example embodiment. In this regard, the cooking controller may chill hot food rapidly in order to stop bacterial proliferation and ensure freshness. As shown in FIG. 7, the cooking controller 40 blast chills a hot food product interior core to about 35° F. via the cold air source at operation 310. The cooking controller 40 then determines whether the food product interior core has reached about 35° F. at operation 320. If the food product interior core has reached about 35° F., then the cooking controller 40 will hold the food product in refrigerated storage at operation 330. However, if the food product interior core has not reached about 35° F., then the cooking controller 40 will continue to blast chill the food product interior core to about 35° F. via the cold air source at operation 310. As such, the cooking controller 40 may repeat the entire process illustrated in FIG. 7 as needed.

According to certain embodiments, for example, the cooking controller 40 may blast chill the hot food product interior core to a temperature from about 32° F. to about 40° F. In other embodiments, for instance, the cooking controller 40 may blast chill the hot food product interior core to a temperature from about 33° F. to about 37° F. In further embodiments, for example, the cooking controller 40 may blast chill the hot food product interior core to a temperature to about 35° F. As such, in certain embodiments, the cooking controller 40 may blast chill the hot food product interior core to a temperature from at least about any of the following: 32, 33, 34, and 35° F. and/or at most about 40, 39, 38, 37, 36, and 35° F. (e.g., about 34-38° F., about 35-40° F., etc.).

Figure 8:
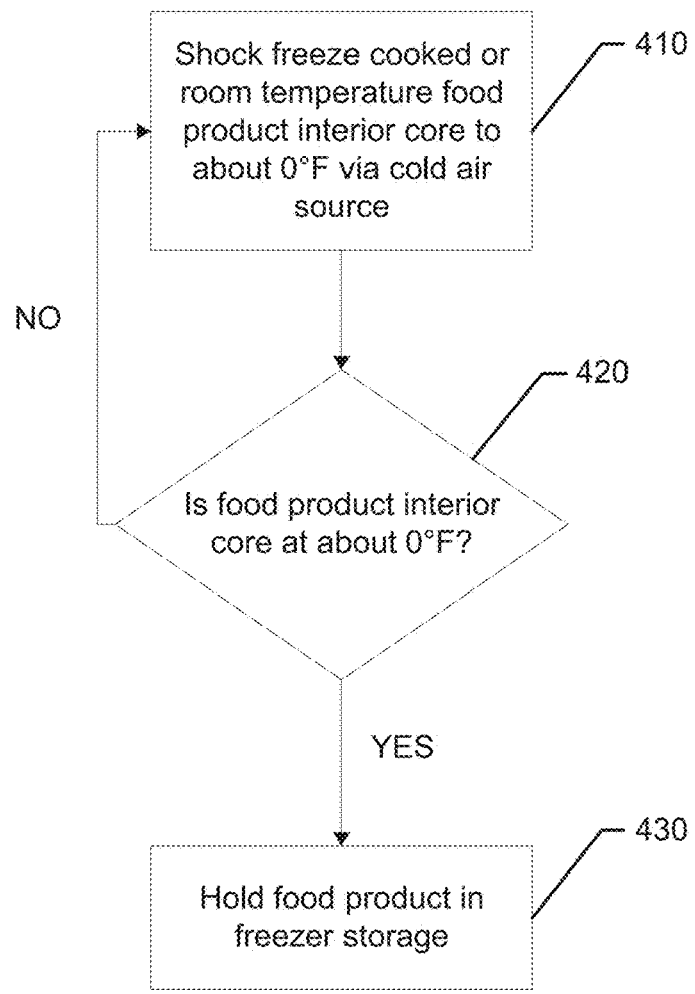
FIG. 8 illustrates a control flow diagram of one example of how the cooking controller shock freezes a food product in accordance with an example embodiment.

FIG. 8, for example, illustrates a control flow diagram one example of how the cooking controller 40 shock freezes a food product in accordance with an example embodiment. In this regard, the faster freezing takes place, the better food quality is preserved. As such, when "shock frozen" food is thawed, it will retain its freshness and quality as if it had never been in the freezer. As shown in FIG. 8, the cooking controller 40 shock freezes a cooked or room temperature food product interior core to about 0° F. via the cold air source at operation 410. The cooking controller 40 then determines whether the food product interior core has reached about 0° F. at operation 420. If the food product interior core has reached about 0° F., then the cooking controller 40 will hold the food product in freezer storage at operation 430. If the food product interior core has not reached about 0° F., then the cooking controller 40 may continue to shock freeze the food product interior core to about 0° F. via the cold air source at operation 410. As such, the cooking controller 40 may repeat the entire process illustrated in FIG. 8 as needed.

According to certain embodiments, for example, the cooking controller 40 may shock freeze the food product interior core to a temperature from about −50° F. to about 20° F. In other embodiments, for instance, the cooking controller 40 may shock freeze the food product interior core to a temperature from about −40° F. to about 10° F. In further embodiments, for example, the cooking controller 40 may shock freeze the food product interior core to a temperature to about 0° F. As such, in certain embodiments, the cooking controller 40 may thaw the food product interior core to a temperature from at least about any of the following: −50, −40, −30, −20, −10, and 0° F. and/or at most about 20, 15, 10, 5, and 0° F. (e.g., about −40-0° F., about −10-10° F., etc.).

Figure 9:
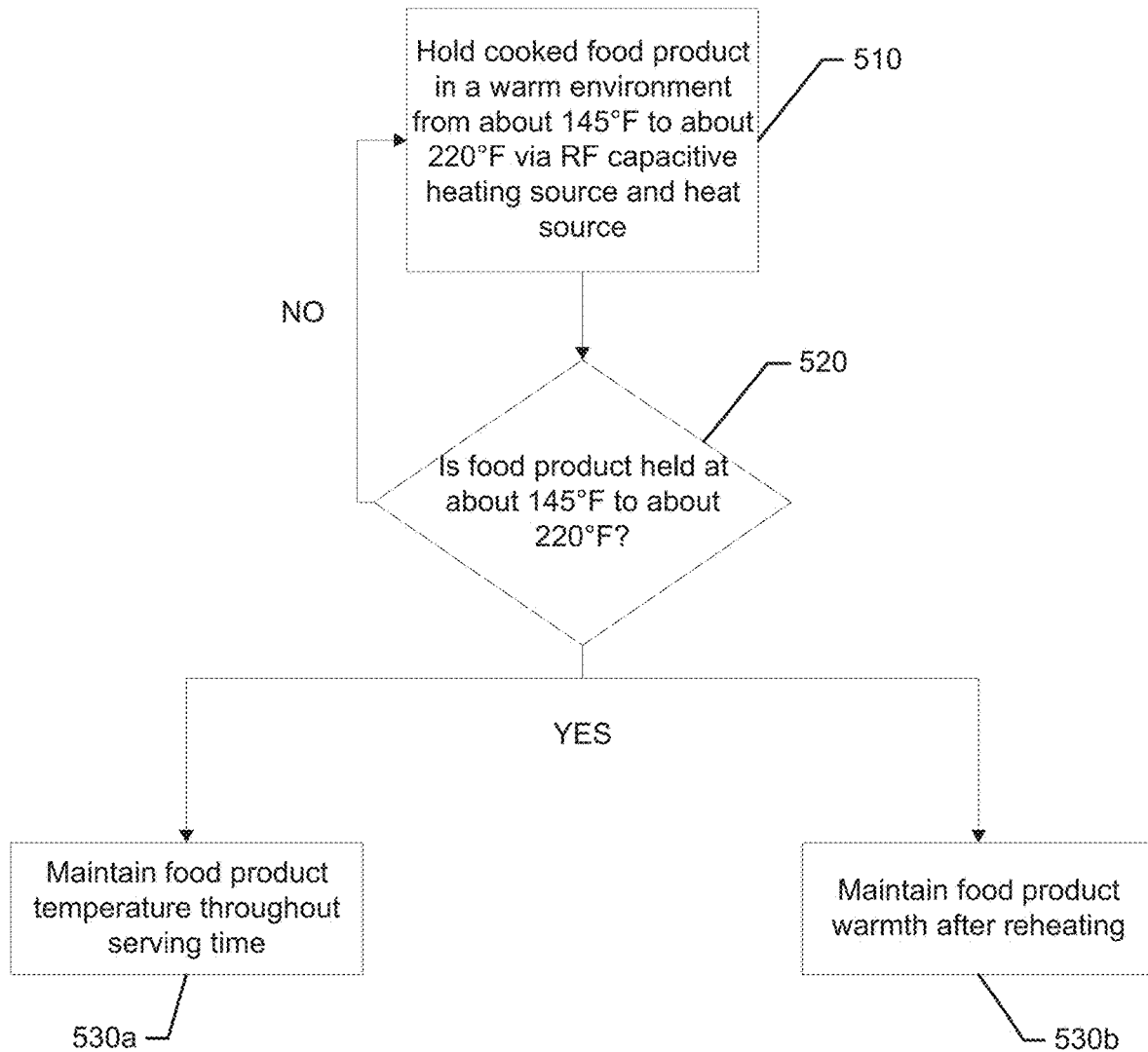
FIG. 9 illustrates a control flow diagram of one example of how the cooking controller holds a food product at a temperature according to an example embodiment.

FIG. 9, for example, illustrates a control flow diagram of one example of how the cooking controller 40 holds a food product at a temperature according to an example embodiment. As shown in FIG. 9, the cooking controller 40 holds a cooked food product in a warm environment from about 145° F. to about 220° F. via the RF capacitive heating source and the heat source at operation 510. The cooking controller 40 then determines whether the food product is adequately held at about 145° F. to about 220° F. at operation 520. If the food product is adequately held at about 145° F. to about 220° F., then the cooking controller 40 either will maintain the food product temperature throughout serving time or maintain the food product warmth after reheating at operations 530a and 530b respectively depending on the food product preparation program selected by an operator. However, if the food product is not adequately held at about 145° F. to about 220° F., then the cooking controller 40 may continue to hold the food product in a warm environment from about 145° F. to about 220° F. via the RF capacitive heating source and the heat source at operation 510. As such, the cooking controller 40 may repeat the entire process illustrated in FIG. 9 as needed. In some example embodiments, the cooking controller 40 may thaw the food product before holding the food product at a selected temperature. In further embodiments, the cooking controller 40 may automatically reheat food products to a serving temperature of about 165° F. after holding the food product at a selected temperature.

Figure 10:
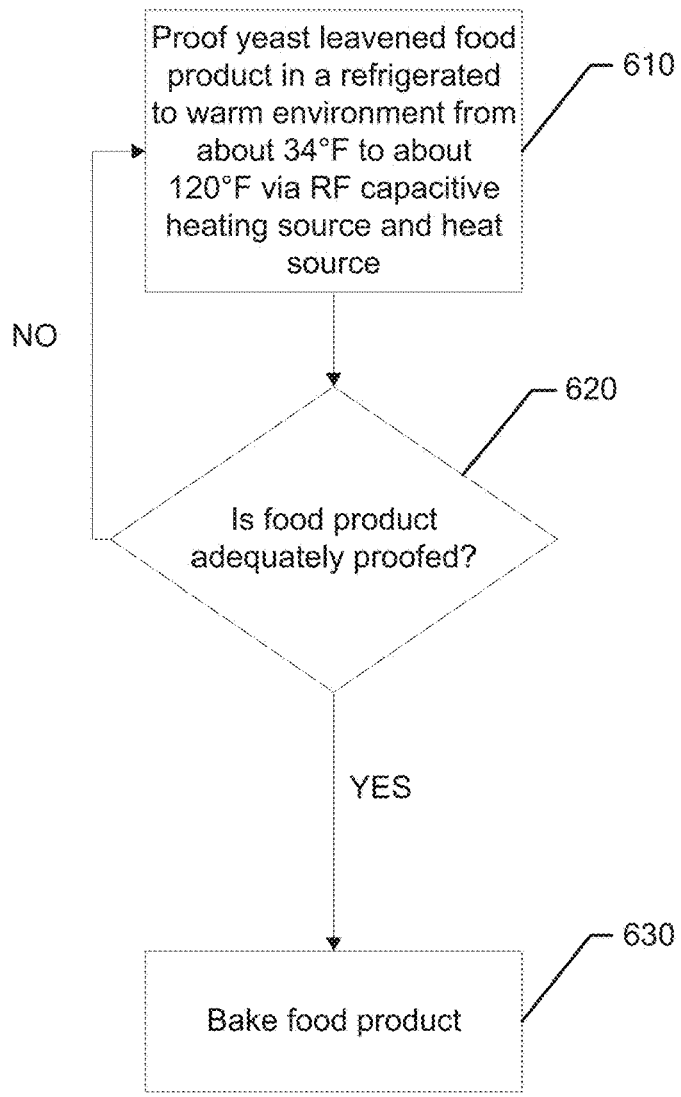
FIG. 10 illustrates a control flow diagram of one example of how the cooking controller proofs a food product according to an example embodiment.

FIG. 10, for example, illustrates a control flow diagram of one example of how the cooking controller 40 proofs a food product according to an example embodiment. As shown in FIG. 10, the cooking controller 40 proofs a yeast leavened food product (e.g., yeast leavened dough for bread or pizza) in a refrigerated to warm environment from about 34° F. to about 120° F. via the RF capacitive heating source and the heat source at operation 610. The cooking controller 40 then determines whether the food product is adequately proofed at operation 620. If the food product is adequately proofed, then the cooking controller 40 may bake the food product at operation 630. If the food product is not adequately proofed, then the cooking controller 40 may continue proofing the food product in a refrigerated to warm environment from about 34° F. to about 120° F. via the RF capacitive heating source and the heat source at operation 610. As such, the cooking controller 40 may repeat the entire process illustrated in FIG. 10 as needed. In this regard, the cooking controller 40 maintains an ideal proofing temperature so that the yeast fermentation cycle is completed in ideal conditions. Moreover, the food preparation device may be used to program thawing for frozen yeast dough products (e.g., croissants). In such embodiments, the frozen yeast dough products may be thawed and then proofed at a controlled temperature and humidity for later baking.

Figure 11:
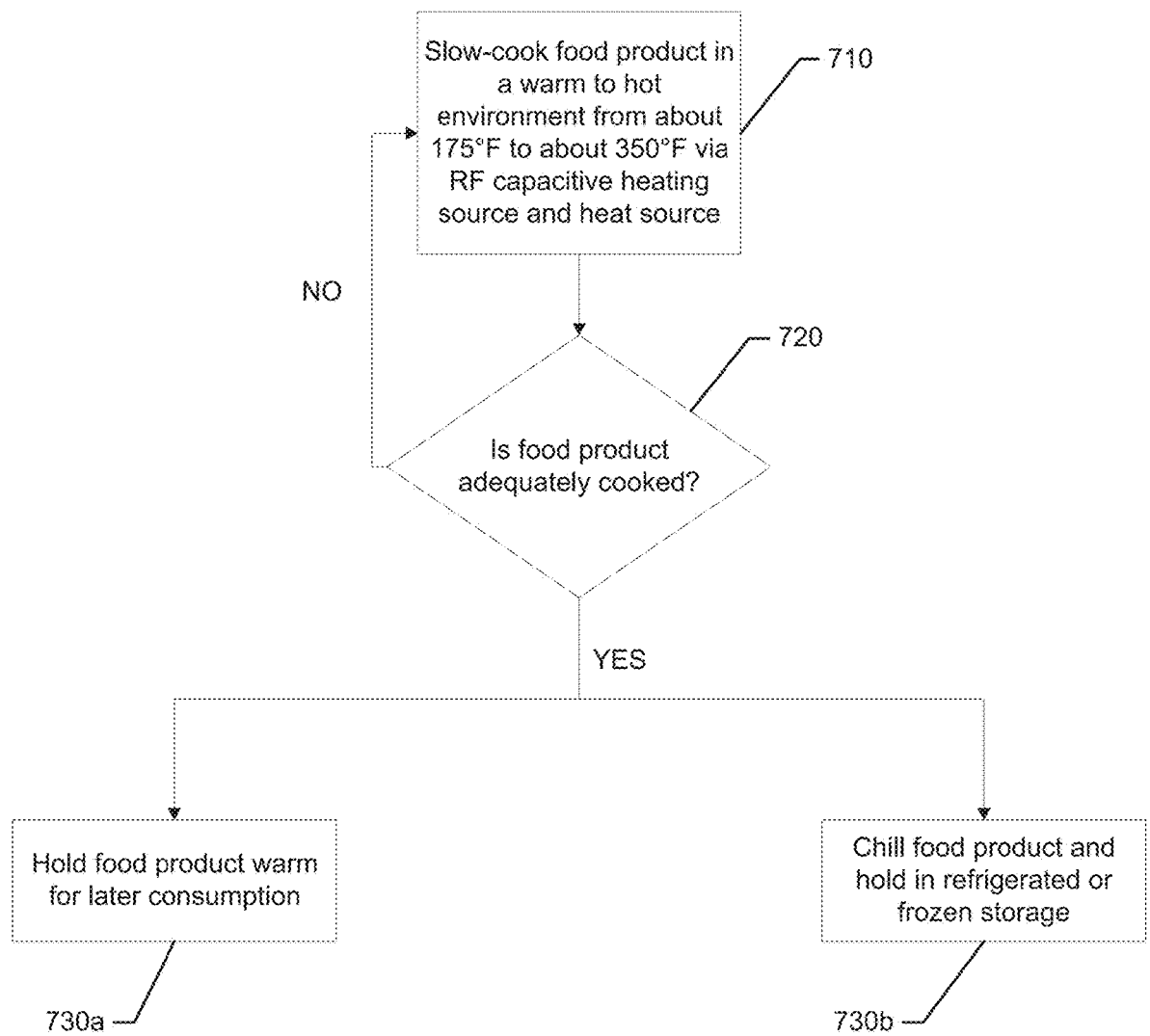
FIG. 11 illustrates a control flow diagram of one example of how the cooking controller slow-cooks a food product according to an example embodiment.

FIG. 11, for example, illustrates a control flow diagram of one example of how the cooking controller slow-cooks a food product according to an example embodiment. In this regard, food products may be cooked slowly and at low temperatures to, for example, effectively tenderize tough muscle cuts and achieve sufficient flavor and quality characteristics. As shown in FIG. 11, the cooking controller slow-cooks a food product in a warm to hot environment from about 175° F. to about 350° F. via the RF capacitive heating source and the heat source at operation 710. The cooking controller then determines whether the food product is adequately cooked at operation 720. If the food product is adequately cooked, then the cooking controller can either hold the food product warm for later consumption at operation 730a or chill the food product and hold the chilled food product in refrigerated or frozen storage at operation 730b. Moreover, the food product may be immediately consumed. However, if the food product is not adequately cooked, then the cooking controller will continue to slow-cook the food product in a warm to hot environment from about 175° F. to about 350° F. via the RF capacitive heating source and the heat source at operation 710. As such, the cooking controller may repeat the entire process illustrated in FIG. 11 as needed. According to certain embodiments, slow-cooking may be preceded by thawing or holding at about 35° F.

Figure 12:
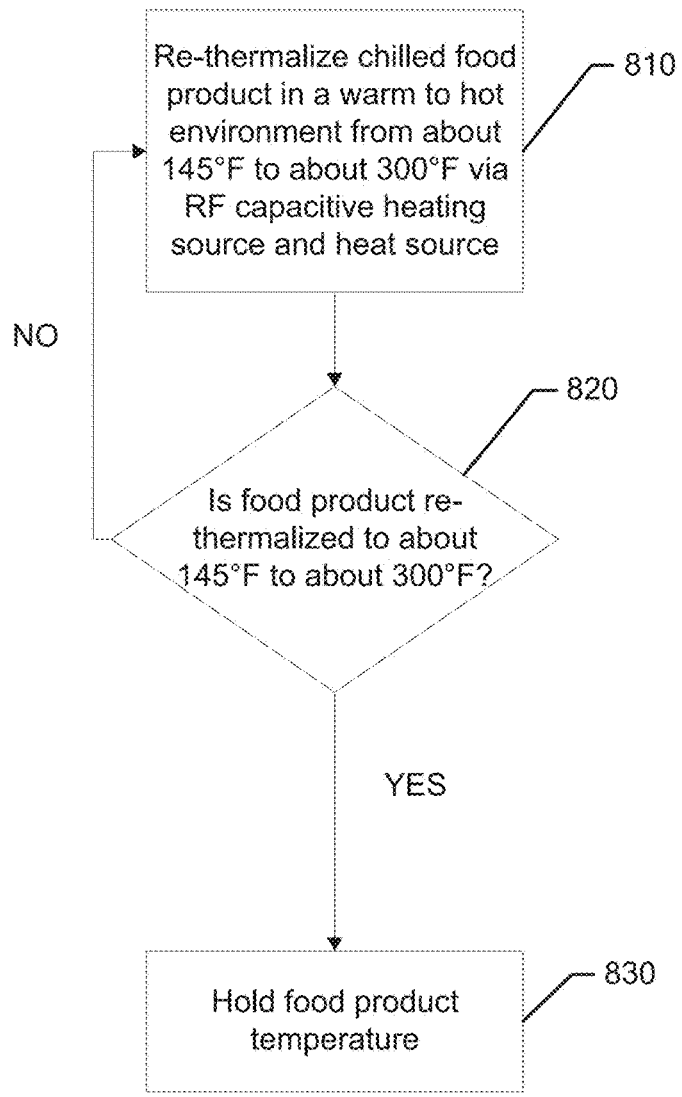
FIG. 12 illustrates a control flow diagram of one example of how the cooking controller re-thermalizes a food product according to an example embodiment.

FIG. 12, for example, illustrates a control flow diagram of one example of how the cooking controller re-thermalizes a food product according to an example embodiment. As shown in FIG. 12, the cooking controller re-thermalizes a chilled food product in a warm to hot environment from about 145° F. to about 300° F. via the RF capacitive heating source and the heat source at operation 810. The cooking controller then determines whether the food product has been adequately re-thermalized to about 145° F. to about 300° F. at operation 820. If the food product has been adequately re-thermalized to about 145° F. to about 300° F., then the cooking controller may hold the food product temperature at operation 830. However, if the food product has not been adequately re-thermalized to about 145° F. to about 300° F., then the cooking controller will continue to re-thermalize the food product in a warm to hot environment from about 145° F. to about 300° F. at operation 810. As such, the cooking controller may repeat the entire process illustrated in FIG. 12 as needed. In some example embodiments, the cooking controller may hold food products at about 35° F. before automatically reheating the food product to a serving temperature of about 165° F. In further embodiments, the cooking controller may thaw the food product prior to holding the food product at a selected temperature.

In this regard, the food preparation device may transform from a freezer to a cooker, effectively transforming a food product initially held frozen in storage to a hot and servable dish for immediate consumption. The entire process may be automated such that the operator must only supply the food item and initiate the correct program. Once the food product is cooked, it may be held warm at a safe and servable temperature or it may be rapidly chilled for safe storage and use later. As such, the food preparation device may provide via the cooking controller a series of different operations (e.g., thawing, tempering, blast chilling, shock freezing, holding, proofing, slow-cooking, re-thermalizing and/or the like), some of which occur simultaneously or at distinct times, within the same volume.

Figure 13:
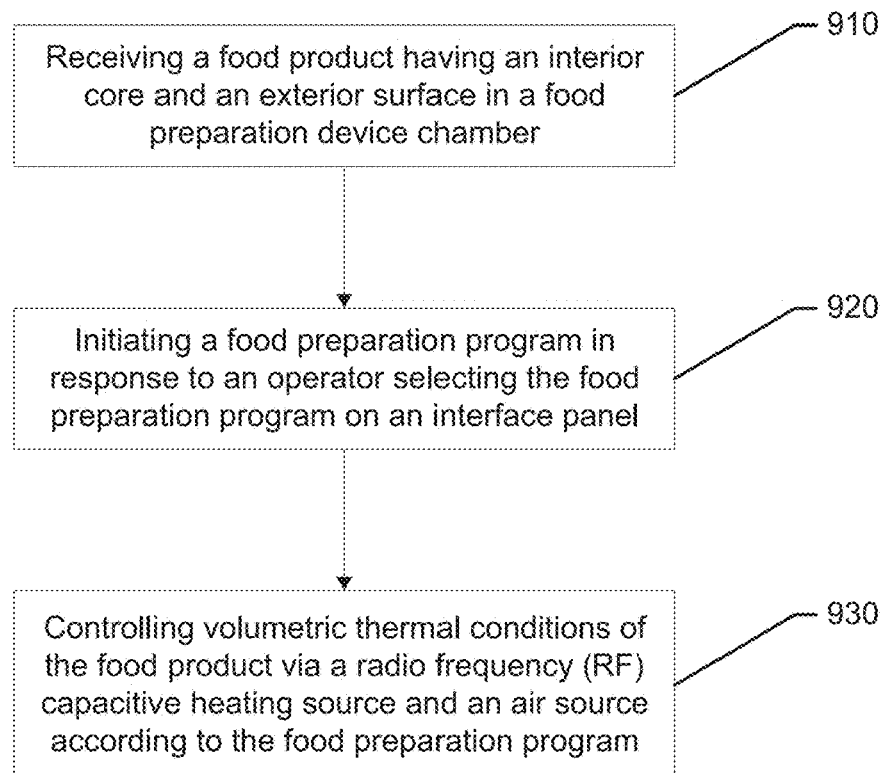
FIG. 13 illustrates a block diagram of a method of preparing food in accordance with an example embodiment.

In another aspect, a method of preparing food is provided. The method may include receiving a food product having an interior core and an exterior surface in a food preparation device chamber, initiating a food preparation program in response to an operator selecting the food preparation program on an interface panel, and controlling volumetric thermal conditions of the food product via an RF capacitive heating source and an air source according to the food preparation program. The RF capacitive heating source may include a ground plate and an anode plate, and the air source may include at least one of a cold air source or a heat source. FIG. 13, for example, illustrates a block diagram of a method of preparing food in accordance with an example embodiment. As shown in FIG. 13, the method includes receiving a food product having an interior core and an exterior surface in a food preparation device chamber at operation 910, initiating a food preparation program in response to an operator selecting the food preparation program on an interface panel at operation 920, and controlling volumetric thermal conditions of the food product via an RF capacitive heating source and an air source according to the food preparation program at operation 930.

Example embodiments may provide a food preparation device capable of providing even thawing of a food product from the exterior surface to the interior core by thawing the interior core with an RF capacitive heating source while cooling the exterior surface with a cold air source. Moreover, the food preparation device may simplify food preparation by providing various operator-selectable recipes and cycles to further prepare the food product.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A food preparation device comprising:
   at least two energy sources;
   a chamber into which at least two types of energy are providable via the at least two energy sources; and
   a cooking controller operably coupled to the at least two energy sources and comprising processing circuitry to selectively distribute power to respective ones of the at least two energy sources and further comprising a wireless thermal probe having a quartz-crystal resonator and a nuclear magnetic resonance (NMR) coil, wherein the quartz-crystal resonator changes quartz resonance frequency in response to temperature variations, and the NMR coil detects changes in the quartz resonance frequency,
   wherein the at least two energy sources comprise a radio frequency (RF) capacitive heating source and a cold air source,
   wherein the RF capacitive heating source comprises a ground plate and an anode plate disposed parallel to each other at top and bottom portions of the chamber, respectively, and
   wherein the RF capacitive heating source is configured to cook and thaw a food product disposed in the chamber.

2. The food preparation device of claim 1, wherein one of the ground plate or the anode plate is mobile along a vertical axis.

3. The food preparation device of claim 2, further comprising a proximity sensor to sense a distance between the ground plate and the anode plate.

4. The food preparation device of claim 1, further comprising:
   a door configured to hingedly operate to alternately allow access to the chamber and close the chamber for food preparation; and
   an interface panel.

5. The food preparation of device of claim 1, wherein the RF capacitive heating source transmits RF energy into the food product from about 10 MHz to about 50 MHz to heat the food product.

6. The food preparation device of claim 1, further comprising a heat source.

7. The food preparation device of claim 6, wherein each of the cold air source and the heat source comprises an air flow generator, the cold air source further comprising a chilling element, and the heat source further comprising a heating element.

8. The food preparation device of claim 6, wherein the heat source comprises at least one of magnetic induction, infrared light, hot convection air, steam, or any combination thereof.

9. The food preparation device of claim 1, wherein the cooking controller monitors at least one of humidity, temperature, time, or any combination thereof.

10. The food preparation device of claim 1, wherein the cooking controller is configured to control volumetric thermal conditions of a food product having an interior core and an exterior surface.

11. The food preparation device of claim 10, wherein the cooking controller is configured to rapidly thaw the food product via the RF capacitive heating source and the cold air source, such that the cooking controller thaws the food product interior core to about 35° F. and maintains the food product at about 35° F. until ready for use.

12. The food preparation device of claim 10, wherein the cooking controller is configured to rapidly temper the food product via the RF capacitive heating source and the cold air source, such that the cooking controller thaws the food product interior core and maintains a cold environment in the food preparation device from about −20° F. to about 32° F.

13. The food preparation device of claim 10, wherein the cooking controller is configured to blast chill the food product via the RF capacitive heating source and the cold air source, such that the cooking controller rapidly chills the food product interior core to about 35° F. and holds the food product in refrigerated storage.

14. The food preparation device of claim 10, wherein the cooking controller is configured to shock freeze the food product via the RF capacitive heating source and the cold air source, such that the cooking controller rapidly chills the food product interior core to about 0° F. and holds the food product in frozen storage.

15. The food preparation device of claim 10, wherein the cooking controller is configured to hold the food product at a selected temperature via the RF capacitive heating source and the heat source, such that the cooking controller maintains a warm environment in the food preparation device from about 145° F. to about 220° F.

16. The food preparation device of claim 10, wherein the cooking controller is configured to proof the food product via the RF capacitive heating source and the heat source, such that the cooking controller maintains a refrigerated to warm environment in the food preparation device from about 34° F. to about 120° F.

17. The food preparation device of claim 10, wherein the cooking controller is configured to slow-cook the food product via the RF capacitive heating source and the heat source, such that the cooking controller maintains a warm to hot environment in the food preparation device from about 175° F. to about 350° F.

18. The food preparation device of claim 10, wherein the cooking controller is configured to re-thermalize the food product via the RF capacitive heating source and the heat source, such that the cooking controller maintains a warm to hot environment in the food preparation device from about 145° F. to about 300° F.

* * * * *